US008986118B2

(12) United States Patent
Homer

(10) Patent No.: US 8,986,118 B2
(45) Date of Patent: Mar. 24, 2015

(54) METHOD AND SYSTEM FOR SECRETLY REVEALING ITEMS ON A MULTI-TOUCH INTERFACE

(75) Inventor: Alois Homer, Vienna (AT)

(73) Assignee: Novomatic AG, Gumpoldskirchen (AT)

( * ) Notice: Subject to any disclaimer, the term of this patent is extended or adjusted under 35 U.S.C. 154(b) by 560 days.

(21) Appl. No.: 12/917,744

(22) Filed: Nov. 2, 2010

(65) Prior Publication Data

US 2012/0108336 A1    May 3, 2012

(51) Int. Cl.
*A63F 13/00* (2014.01)
*G07F 17/32* (2006.01)
*G06F 3/0488* (2013.01)
*G07F 7/10* (2006.01)

(52) U.S. Cl.
CPC .......... *G07F 17/322* (2013.01); *G07F 17/3213* (2013.01); *G07F 17/3209* (2013.01); *G06F 3/0488* (2013.01); *G06F 3/04883* (2013.01); *G06F 2203/04808* (2013.01); *G07F 7/1033* (2013.01); *G07F 17/3211* (2013.01); *G07F 17/3293* (2013.01)
USPC .................. 463/31; 463/12; 463/13; 463/30; 463/32; 463/37

(58) Field of Classification Search
CPC ............ G07F 17/3209; G07F 17/3211; G07F 17/3213
USPC ..................................... 463/12, 13, 30–33, 37
See application file for complete search history.

(56) References Cited

U.S. PATENT DOCUMENTS

| | | |
|---|---|---|
| 7,663,606 B2 | 2/2010 | Mattice |
| 2006/0058091 A1 | 3/2006 | Crawford, III et al. |
| 2006/0189384 A1* | 8/2006 | Crawford et al. ............... 463/31 |
| 2006/0264252 A1* | 11/2006 | White et al. .................... 463/13 |
| 2007/0149283 A1* | 6/2007 | Poh et al. ........................ 463/37 |
| 2008/0268932 A1* | 10/2008 | Nagano .......................... 463/11 |
| 2009/0124379 A1 | 5/2009 | Wells |
| 2009/0143141 A1* | 6/2009 | Wells et al. .................... 463/37 |

(Continued)

FOREIGN PATENT DOCUMENTS

| | | |
|---|---|---|
| IT | EP2218486 A1 | 8/2010 |
| SG | EP1786531 B1 | 4/2009 |

(Continued)

OTHER PUBLICATIONS

Wu, M et al. "Multi-finger and whole hand gestural interaction techniques for multi-user tabletop displays", Proceedings of the 16th Annual ACM Symposioum on User Interface Software and Technology: Vancouver, Canada, Nov. 2-5, 2003, ACM Press, New York, NY vol. 5, No. 2, Nov. 2, 2003, pp. 193-202.*

(Continued)

*Primary Examiner* — Lawrence Galka
(74) *Attorney, Agent, or Firm* — Kevin H. Fortin

(57) ABSTRACT

An apparatus and method including a multi-touch interface for card gaming includes providing a multi-touch interface for displaying a card having a hidden value. The method includes detecting a touch on the interface. The touch has a curved pattern with multiple points of contact with the interface. The curved pattern is indicative of the lateral edge of a human hand in contact with the interface, oriented to hide the card from others. The method then detects movement of the multiple points of contact sweeping over a portion of the interface to reveal the value of the card to the user.

20 Claims, 5 Drawing Sheets

(56) References Cited

U.S. PATENT DOCUMENTS

| | | | |
|---|---|---|---|
| 2009/0191946 A1* | 7/2009 | Thomas et al. | 463/20 |
| 2010/0130280 A1 | 5/2010 | Arezina | |
| 2010/0255914 A1* | 10/2010 | Poh et al. | 463/37 |

FOREIGN PATENT DOCUMENTS

| WO | WO0016863 A1 | 3/2000 | |
|---|---|---|---|
| WO | WO 2011/094936 A1 * | 8/2011 | H04M 1/725 |

OTHER PUBLICATIONS

Wu M et al.: "Multi-finger and whole hand gestural interaction techniques for multi-user tabletop displays", Proceedings of the 16H Annual ACM Symposium on User Interface Software and Technology: Vancouver, Canada, Nov. 2-5, 2003, ACM Press, New York, NY vol. 5, No. 2, Nov. 2, 2003, pp. 193-202.

* cited by examiner

METHOD AND SYSTEM FOR SECRETLY REVEALING ITEMS ON A MULTI-TOUCH INTERFACE

FIELD OF THE INVENTION

The invention pertains to user interaction with a multi-touch interface, and particularly to ways of concealing revealed items in a card game.

BACKGROUND OF THE INVENTION

The Apple iPhone™ popularized the multi-touch interface to the extent that it has become to be a must-have feature on smart phones. Multi-touch technology is also gaining prominence with computer systems and current operating systems are adapted to handle multi-touch interfaces. Multi-touch interfaces are employed in restaurant order systems, retail systems, handheld tablets, and on laptop computers, for example. This technology is also gaining popularity with video gaming and entertainment systems.

Traditional methods of revealing items on a multi-touch screen include using a finger to press and thereby actuate a virtual button, or to drag a finger along a screen to see a list of items, or to scroll lengthy text across the screen. It is possible, however, that others may see the items revealed while the user is scrolling or actuating a virtual button.

Secrecy is typically sought by those engaged in financial transactions. Card gaming, particularly where are financial rewards are sought, is another field where publicly revealing information can have adverse effects on game play and ultimately any financial rewards gained. Even where financial reward is not at stake, the prospect of winning a card game provides ample incentive for players to maintain secrecy.

There have been various attempts to effectively operate card games on an electronic gaming interface. Such attempts provide varying degrees of secrecy.

US Patent Publication Number US2006/0058091 A1 discloses card gaming machines having interfaces in a networked environment to facilitate tournament card-game play. The machines are particularly adapted for poker gaming, where some cards are revealed to all players, and other cards are not. Hole cards, which normally lie face down, are revealed to a player by touching a virtual button on the touch screen near the hole cards.

European Patent Number EP2218486 A1 Claims a two-handed method of operating a touch screen user interface for card gaming machines. A virtual card, or card stack, is shown on a touch screen. A user places the edge of one hand on the screen to activate the screen. The user slides a finger of the other hand to reveal playing cards. The position of the screen-activating hand promotes secrecy. One limitation of this method is that two hands are required.

A drawback of many interfaces is that card values or other information may be inadvertently revealed to others. What is desired is a method and system employing an interface that will assure that cards not intended to be revealed to others remain hidden from public view.

SUMMARY OF THE INVENTION

A system and method for using a touch interface for card gaming includes providing a multi-touch interface for displaying a card having a hidden value. The method includes detecting a touch on the interface. The touch includes a curved pattern having multiple points of contact with the interface. The curved pattern may be indicative of the lateral edge of a human hand in contact with the interface, oriented to hide the card from others. The method then may detect movement of the multiple points of contact sweeping over a portion of the interface to reveal the value of the card to the user.

Various movements can be detected in accordance with the present invention. In one embodiment, the card has a center and detecting a movement detects a movement sweeping towards the center of the card. Alternately, the movement is detected over the center of the card. The center can be the true center, or a center line in either a longitudinal, or latitudinal orientation.

The card has a front side displaying a value, a rear side and a corner. The rear side is normally presented to a user, and the step of revealing the value of the card includes bending the corner of the card to reveal at least one corner of the front side of the card in response to the sweeping motion.

The value of the card can be re-hidden by reversing the sweeping motion or by removing the hand from the interface. In this way both un-detecting the touch hides the value of the card and detecting a second (reverse) movement sweeping away from the card hides the value of the card.

According to one aspect of the invention, detecting movement detects a linear movement of the multiple points of contact over the card.

According to another aspect of the intention, detecting movement simultaneously detects an arcuate movement of the multiple points of contact over the card. In this embodiment the movement defines an arc having an angle of between 5 degrees and 90 degrees and preferably between 10 and 60 degrees.

DETAILED DESCRIPTION

Figure 1A:
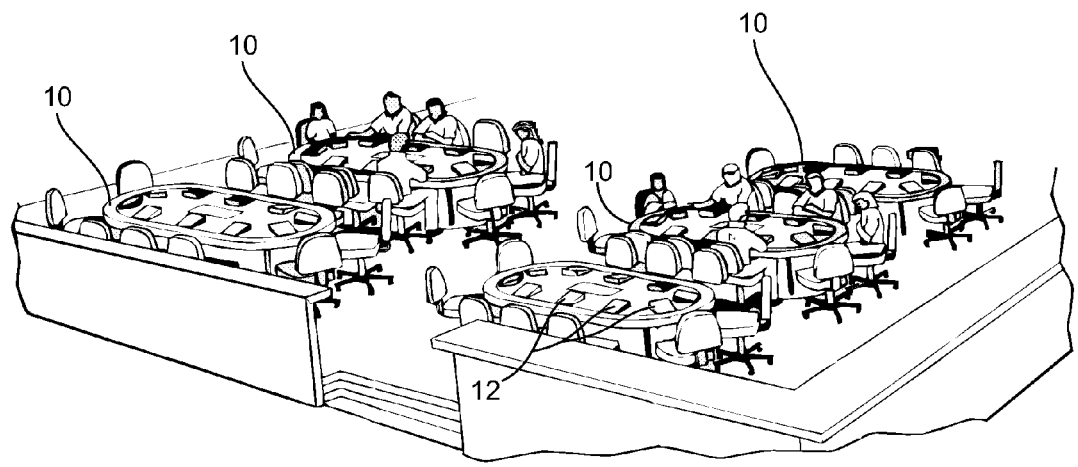
FIG. 1A is a perspective view of a room having several gaming tables.

FIG. 1A shows a room having numerous gaming tables 10. Each table 10 includes a number of interfaces 12 mounted on the table to facilitate game play. Each interface 12 includes a screen capable of tactile input and visual output. It can be appreciated that many rooms may be networked together, and even networked with on-line gaming interfaces. Numerous players in a networked gaming environment enable tournament play, progressive jackpots and other game variants possible with numerous players.

Figure 1B:
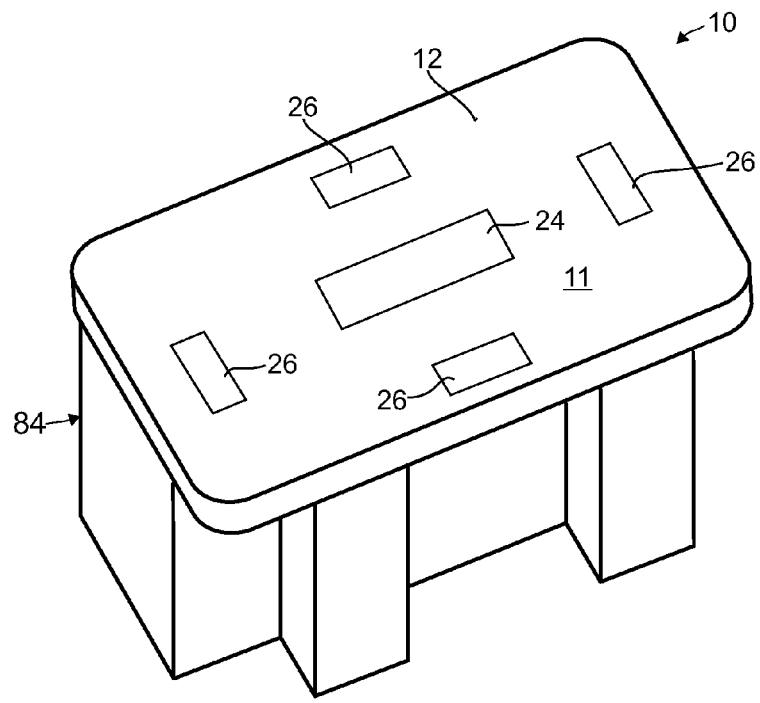
FIG. 1B is a top perspective view of a single gaming table.

FIG. 1B shows an embodiment of a gaming system having a single table 10. The single table 10 has a table top 11, which includes a single multi-touch interface 12 to enable multiple players to share the multi-touch interface 12. The interface 12 displays a dealer hand 24 and four player hands 26. Each hand 24 and 26 consists of a discrete group of cards. Displaying more than one player hand 26 expedites game play for players grouped at the table 10. It can be appreciated that while each player hand 26 may be representative of players in close proximity, or at the same table, the player hands 26 may also be representative of remote players communicating via a network.

The table 10 has a support structure, housing, or cabinet, which provides physical support for the interface 12 and other features needed for a gaming machine. The system is configured such that a player can operate it while standing or sitting. It should be appreciated that the game table may be configured in other suitable manners.

Preferably, the table 10 includes any suitable combination of a printer, a chip tray, a bill acceptor, a secure cashbox, and a smartcard reader device. The table 10 also may house speakers for enabling audio output.

The table 10 may be adapted for displaying game graphics representative of actual objects of various game including cards, dice, and game boards. The table 10 also displays game functions such as bets required, outcomes and awards to one or more players. This enables one or more players and dealers to simultaneously or sequentially interact with the game tables using their hands, or using other physical objects such as playing cards, dice, or wagering chips or other suitable input devices.

While the table 10 has single interface 12 for all players, advantageous variations include a system having a table 10 with a separate interface for each player, or each team of players.

Figure 2:
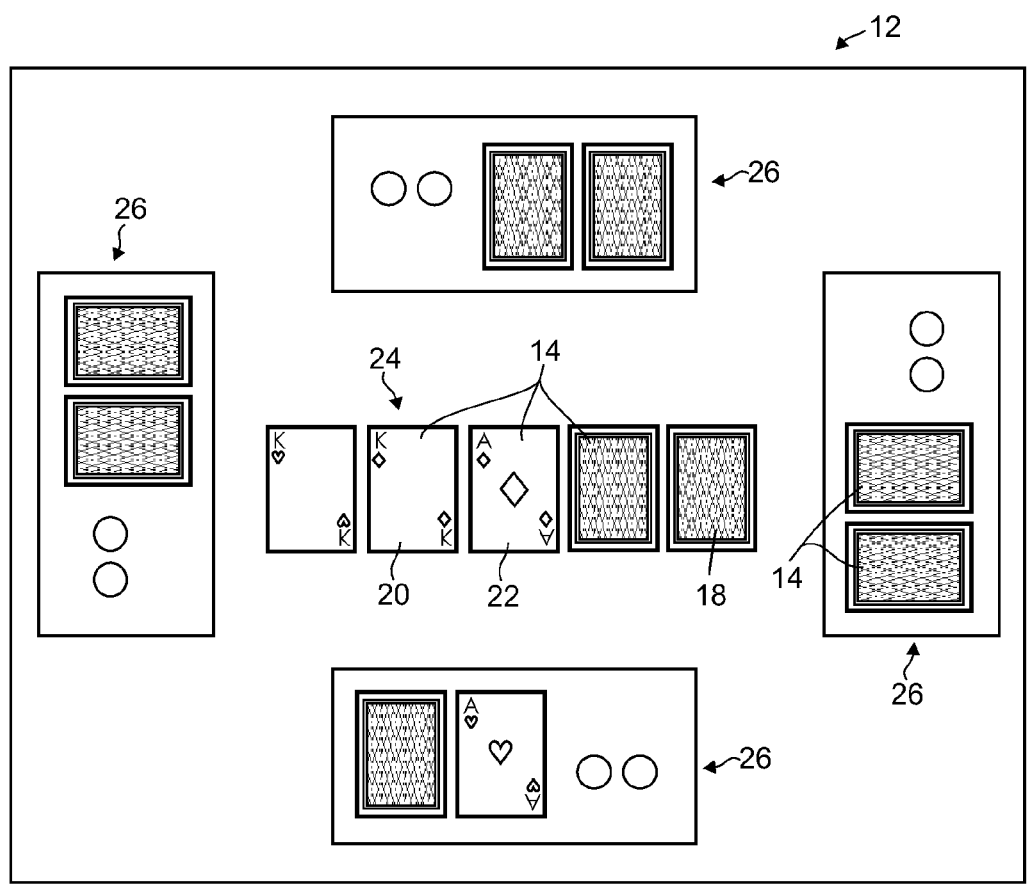
FIG. 2 is a top view of a gaming table.

FIG. 2 shows an interface 12. The interface 12 displays a card game with cards 14 and playing chips 16. Each card 14 is a virtual card, being a representation of a physical playing card. Each card 14 has a back side 18 and a face 20. The back side 18 has a pattern, and the face 20 has a value. For example, card 22 has a value displayed as a graphic with the letter "A" and diamond shape, and being displayed in the color red. This graphic is recognizable by astute card players as being an Ace of Diamonds. Cards 14 may also have graphics representative of numerical values, or any value of a card deck.

In an alternate embodiment, each player has an individual interface, and the individual interfaces are networked together and each interface displays a single player hand.

Figure 3:
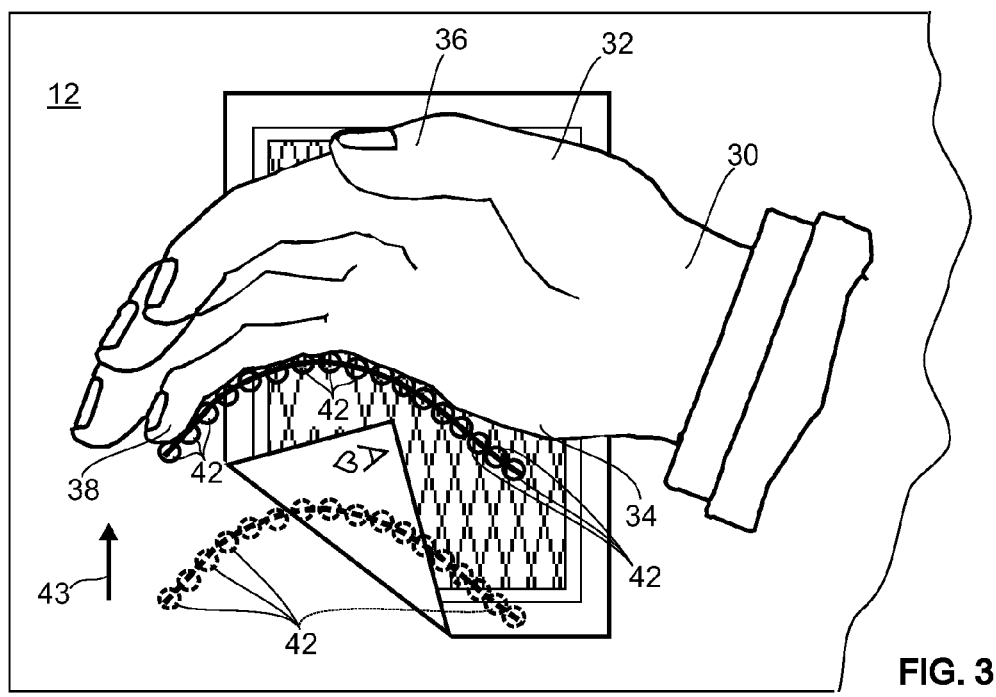
FIG. 3 is a top view of an interface displaying a card.

FIG. 3 shows a hand 30 of a human player on a portion of the interface 12. It is understood that the hand may be a left hand or right hand. The interface 12 displays a card 40. The hand 30 has a medial edge 32 including a thumb 36, and a lateral edge 34 including a pinky finger 38. The hand 30 moves over the card 40 in the direction of the arrow 43. In particular, the lateral edge 34 initially touches the interface 12 along numerous points of contact 42 in proximity of the card 40. The card 40 has a center. The hand 30 slides on the interface 12 towards the center in the direction of the arrow 43 to reveal a portion of the card. According to one aspect of the invention, the hand 30 slides with linear movement.

The interface 12 detects the initial touch and movement of the multiple points of contact 42, which causes the value of the card 40 to be revealed. Detecting the touch as multiple points of contact 42 and movement thereof, assures that the lateral edge 34 of the hand 30 is positioned optimally with respect to the interface 12 to hide the value of the card 40 from other players.

A method of the invention includes providing the interface 12 and displaying a card 40 having a value on the interface 12. The method also includes detecting a touch on the interface 12. The touch includes a curved pattern having multiple points of contact 42 with the interface 12 and is indicative of the lateral edge 34 of a human hand. The multiple points of contact 42 are located along a curved line that is defined by the lateral edge 34 of the human hand. In one embodiment, the touch includes a sweeping movement of the multiple points of contact 42 over a portion of the interface 12 and the interface 12 reveals the value of the card 14 in response to the sweeping movement. Any suitable method may be used for detecting presence and parameters of a curved line based on the multiple points of contact 42 detected by the interface 12. A database may be additionally provided to keep stored model patterns of e.g. various types of hands (of e.g. male, female, kids etc.) and pattern matching may be performed to gain additional information based on the matching.

The value of the card 14 is revealed by bending the card 14 to reveal at least one corner of the card 14, wherein the value is represented by a graphic including a letter or number.

In accordance with one embodiment of the invention, the method completes by un-detecting the touch and hiding the value of the card 40. This is accomplished by displaying the back side of the card previously displayed card. In an alternate embodiment, the method completes by detecting a reverse sweeping movement away from the card 40 to hide the value of the card 40.

Figure 4:
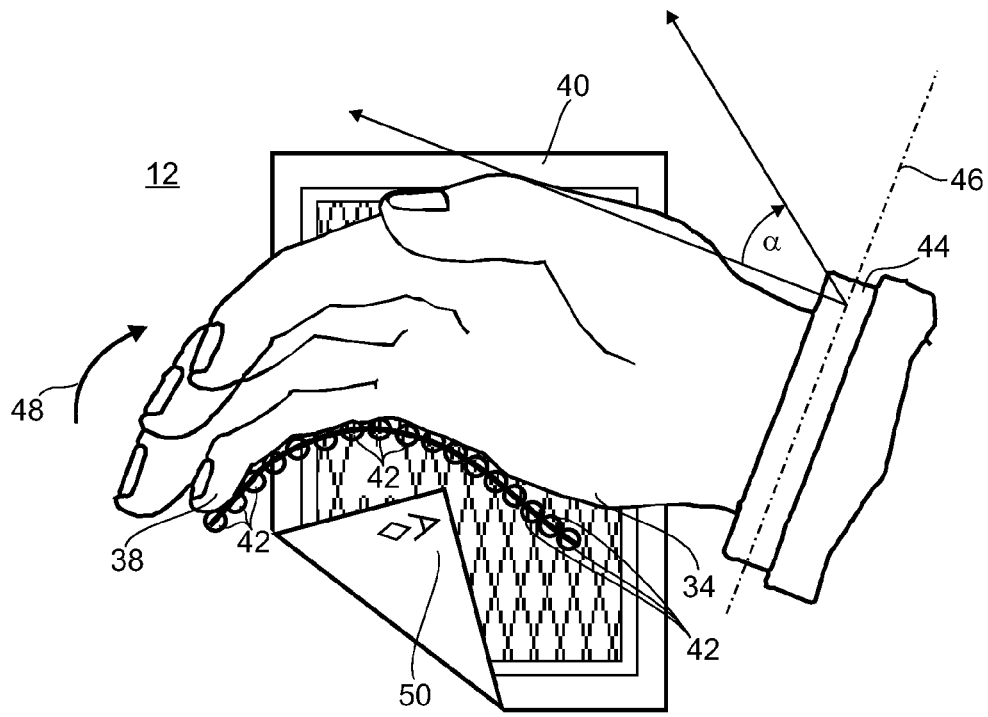
FIG. 4 is a top view of an interface displaying a card.

FIG. 4 shows a human hand 30 having a wrist 44 and an axis 46 defined through the wrist 44. The hand 30 is relaxed having a natural curl, resulting in a curve being defined along the lateral edge 34. Extension of the wrist moves the hand about the axis 46 through the angle α. Preferably, the angle α is between 10 and 60 degrees.

As the wrist the fingers and the lateral edge 34 of the hand sweep in an arcuate movement pattern over the card 40. The axis 46 is the center of rotation for the arcuate movement, which is generally represented by the direction of the arc-arrow 48. It can be appreciated that the fingers also extend slightly, because the wrist and fingers often extend and flex together during normal anatomical movement.

The card 40 has a corner 50. Preferably the movement of the lateral edge 34 is away from and over the corner 50 of the card. The corner 50 of the card flips, revealing the card value when the hand passes over the card 40, away from the corner 50.

Figure 5:
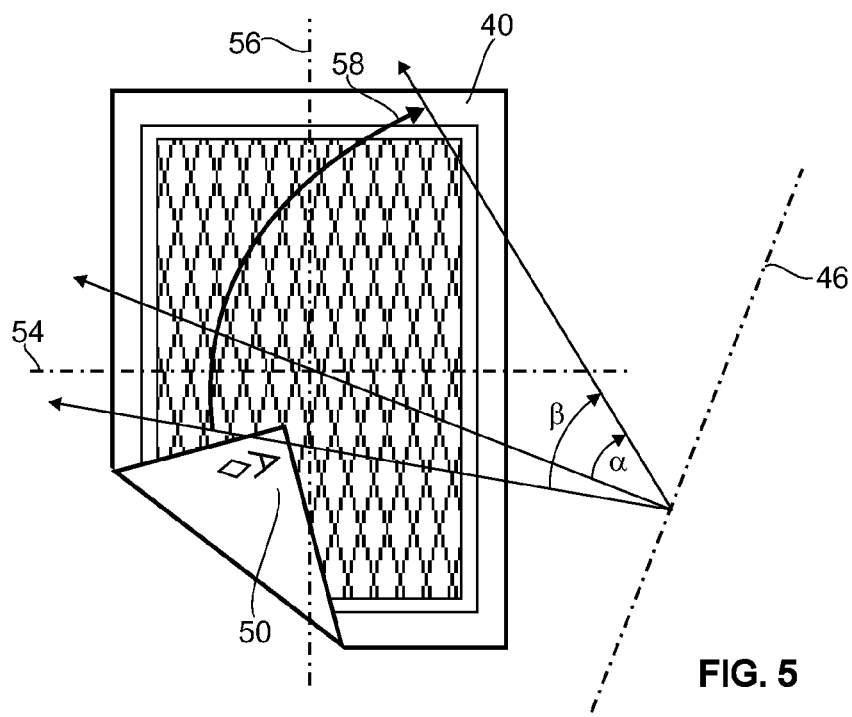
FIG. 5 is a top view of a card.

FIG. 5 shows the card 40. The card 40 has a center 52, a latitudinal line 54 and a longitudinal line 56. The lines 54 and 56 are perpendicular to each other and each are defined along a central axis of the card 40. According to one variation of the invention, the arcuate movement is defined by the arrow 58 and moves between the corner 50 of the card 40 towards the latitudinal line 54. According to another variation of the invention, the arcuate movement extends between the corner 50 towards the longitudinal line 56. In another variation of the invention, the arcuate movement extends generally towards the center 52.

The angle α shows an arcuate movement from near the latitudinal line 54 towards the longitudinal line 56. The angle β shows a second arcuate movement pattern from near the corner 50 of the card past the latitudinal line 54 and towards the longitudinal line 56.

It can be appreciated that while the arcuate movement is shown generally as a curve having a center of curvature at the axis 46. It can be appreciated, however, that movement of the hand is typically not a uniform arc but a function of the movement of the wrist, fingers, elbow and shoulder. The wrist and fingers are of primary import and yield the most range of motion for activities such as writing and flipping cards. The invention includes learned pattern recognition algorithms to recognize movements of players. Accordingly the term "arcuate" as used herein includes a variety of curves indicative of the natural movement of the hand.

Figure 6:
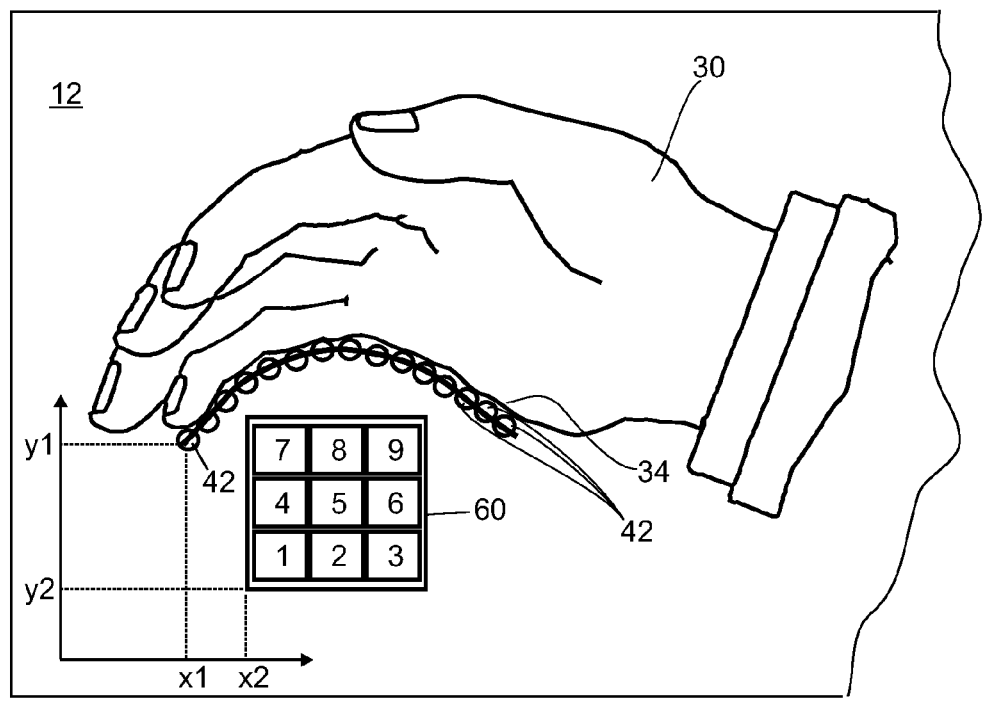
FIG. 6 is a top view of an interface displaying an object.

FIG. 6 shows a hand 30 concealing an object 60 displayed on an interface 12. The object 60 includes a keypad for entering a personal identification number, or other number. The hand 30 has multiple points of contact 42 with the interface 12 to enable the hand 30, when slightly curled and having the lateral edge in contact with the interface 12, to conceal the keypad from others. Sweeping the lateral edge 34 along the interface 12 enables the multiple points of contact 42 to create a recognizable linear or arcuate pattern, while concealing the keypad 60 from others.

In the present embodiment the object 60 is being displayed upon recognition of the touch pattern of the multiple points of contact 42. In a case where the hand is being removed from the interface then the object 60 will be hidden again. The position of the object 60 on the display may be determined by the position information of the multiple points of contact 42, or at least one of those contacts, such that the displayed object 60 will be positioned in the near vicinity of the hand respectively the touch pattern.

A point of reference of the object 60 as located at (x2, y2) and is a particular distance from a point of reference of the points of contact 42 at (x1, y1). When this distance is within a certain range and orientation, the points of contact 42 enable recognition of the touch pattern. Recognition of the touch pattern enables the object 60 to be displayed. In a further aspect, the object 60 may be positioned within a specified direction and distance starting from the points of contact 42 at (x1, y1). The direction may thereby point towards a centre defined by the curved pattern. If the curved pattern is moved, e.g. due to movement of the hand, then the position of the object is adaptively adapted such that the distance between the object and the points of contact 42 remains substantially the same.

Figure 7:
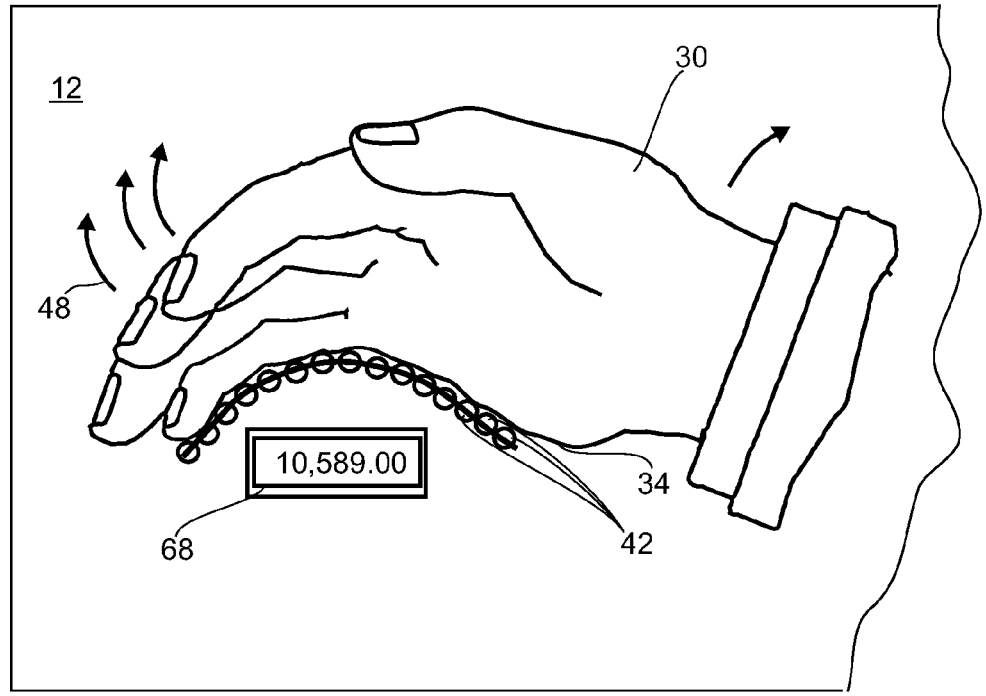
FIG. 7 is a top view of an interface displaying a value.

FIG. 7 shows the hand 30 in contact with the interface 12 along multiple points of contact 42. The hand 30 conceals a secret value 68. The value 68 is preferably a numerical value representative of a financial account balance. Movement of the hand 30 in contact with the interface 12, and in the direction of the arc-arrows 48 reveals the value 68 to the user. The hand 30 is slightly curled, having a curved lateral surface 34 in contact with the interface 12, the curled orientation of the hand conceals the value 68 from others. According to a further aspect, the position of the value 68 on the display may be dependent on the position of the touch pattern defined by means of the hand 30 respectively by the multiple points of contact 42 and the position of the value 68 on the display may track the movement of the hand 30 for instance if moved in direction of the arc-arrows 48.

Figure 8:
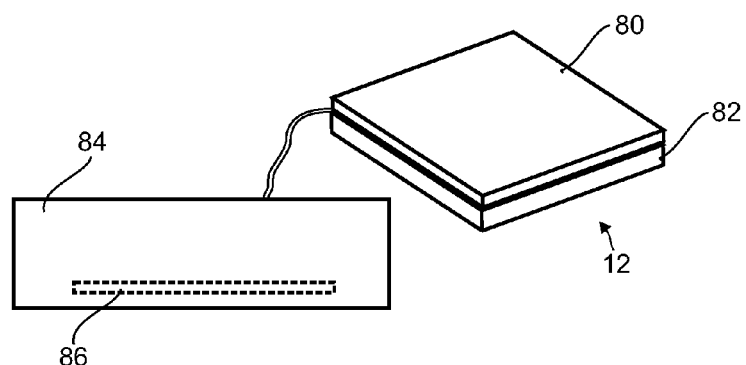
FIG. 8 is an interface with a computer.

FIG. 8 shows an interface 12 in operable connection with a general purpose computer 84. The interface 12 includes a touch sensor 80 integrated with a video display 82, and in communication with the computer 84. The computer 84 includes a main board 86 having a controller, memory for storing software and software drivers, and a central processor.

The touch sensor 80 preferably is a type based on Capacitive, Resistive, Surface Acoustic Wave (SAW)/Grounded Acoustic Wave (GAW) or similar technologies. It can be appreciated that numerous ways of sensing motion on or above an interface are available and may be developed. The invention can be adapted to such numerous technologies.

The controller receives inputs from the touch sensor 80 and performs various functions in response to the central processor. The memory stores a software driver that allows the controller and central processor to communicate with the interface and allows the controller to recognize input detected by the touch sensor.

The computer 84 may be positioned in close proximity to the interface 12 in accordance with one aspect of the invention. In accordance with another aspect of the invention, the computer is integrated in a remote server and the interface communicates with the server. The computer 84 includes a central processor, memory storage, video display unit with video Input/Outputs (I/O), at least one audio output unit with audio I/O to an audio speaker, a computer operating system, software, software drivers for all I/O peripherals, and serial/parallel and/or USB ports for connection to peripherals such as a printer, smartcard reader devices, and Data I/O interfaces and Data I/O converters/splitters.

A software program is stored in the memory storage of the computer. The program organizes the display of all game components displayed on the interface. The program filters relevant data for action, interpret the meaning of the touch and movement, with considerations from a previous event, present state or a predicted event, and act on the result of the interpretation.

The program comprises algorithms including touch recognition algorithms, a random number controlled algorithm and card bending algorithm. The random number controlled algorithm for example may use a Gaming Labs International (GLI) certified random number generator for doing electronic card shuffling. The card bending algorithm is designed to provide realistic card flipping.

The program manages game play, which includes setting timers for players to respond, issuing, withdrawing, showing or shuffling electronic cards at the appropriate time, responding to a player's or dealer's request, ensuring the correct order of taking turns if the game requires players to take turns, calculating winnings and losses and distributing and withdrawing the virtual chips based on the credits purchased, won or lost. The program also produces sound effects or music through the speakers and displays objects in the interface.

FIG. 8 shows an interface 12 along with functional hardware. The interface 12 includes a touch sensor 80 integrated with a video display 82, and in communication with a general purpose computer 84. The computer 84 includes a main board 86 having a controller, memory connected to the main board 86 for storing software, software stored in the memory for operating the interface, software drivers, and a main processor.

Figure 9:
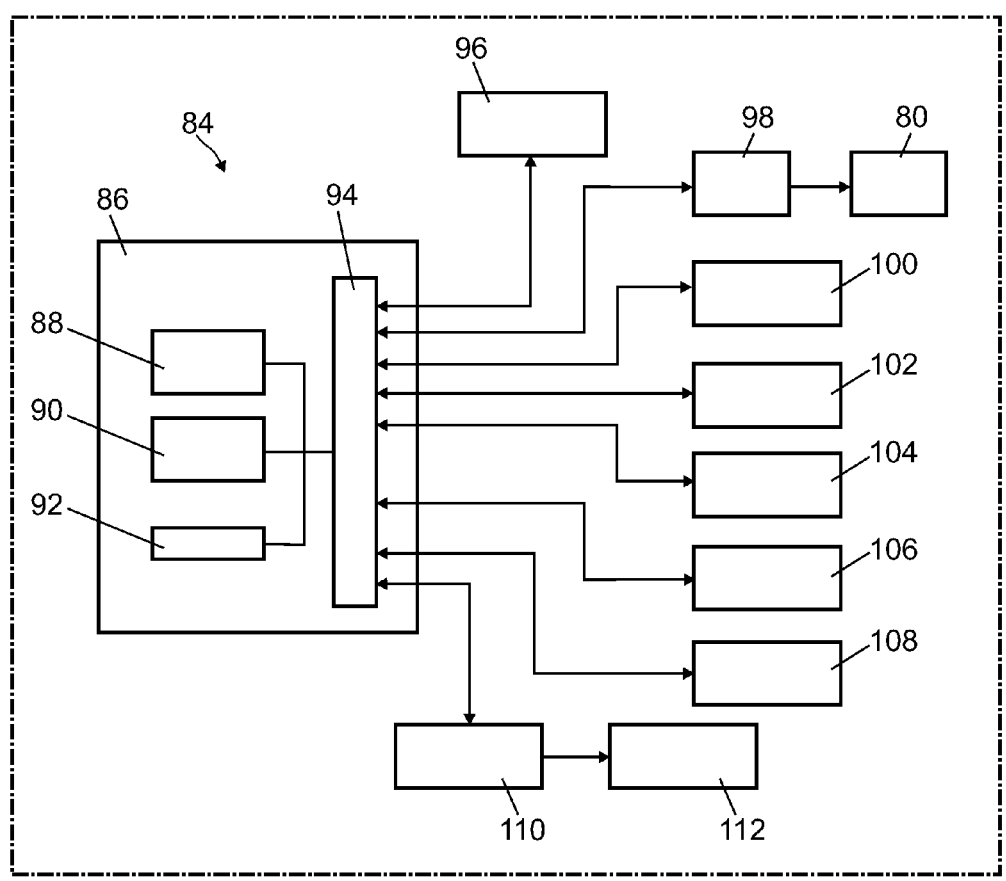
FIG. 9 is a system diagram in accordance with the present invention.

FIG. 9 shows a system diagram of the computer 84. The main board 86 includes program memory 88 being a computer readable medium, a main processor 90 and RAM 92 connected in operative communication. The computer 84 has an input output I/O controller 94. The I/O controller 94 communicates with a control panel 96, a touch screen unit 98, a display unit 100, a coin acceptor 102, a bill acceptor 104, a card reader 106, a ticket reader/printer 108, and a sound circuit 110. The sound circuit 110 is in operative communication with speakers 112.

The touch screen unit 98 preferably includes a touch sensor 80 integrated into the display unit 100. The touch screen unit 98, according to one aspect of the invention, includes a monitor based on Cathode Ray Tube (CRT), Liquid Crystal Display (LCD), plasma, thin film transistor liquid crystal display (TFT-LCD), or similar technologies having a display screen on which the touch sensor 80 can be arranged, fitted or integrated.

The coin acceptor 102 and the bill acceptor 104 accept currency and communicate the amount accepted to the I/O controller 94. The card reader 106 reads credit cards, debit cards, gift cards or other card having electronic indicia of monetary value.

The ticket reader 108 prints tickets and receipts revealing the winnings of a player, or other financial outcome. The ticket reader 108 also receives tickets having indicia of monetary value.

The sound circuit 110 is configured to provide an acoustic-based interface for the user. Each movement or action by a user may result in a particular sound, or instruction being generated by the computer 84. The speakers 112 communicate the sounds to the user.

Interpretation

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and the include plural referents unless the context clearly dictates otherwise. It should also be noted that the term or is generally employed in its sense including "and/or" unless the context clearly dictates otherwise.

The headings and Abstract of the Disclosure provided herein are for convenience only and do not interpret the scope or meaning of the embodiments.

Some portions of this detailed description are presented in terms of procedures, steps, logic blocks, processing, and other symbolic representations of operations on data bits that can be performed on computer memory. Each step may be performed by hardware, software, firmware, or combinations thereof.

Any examples of a database given are thus illustrative of arrangements for the storage of information. Similarly, examples of network topology are illustrative and other topologies may be used.

It will be readily apparent to one of ordinary skill in the art that the various processes described herein may be implemented by, e.g., appropriately programmed general purpose computers, special purpose computers and computing devices. Typically a processor e.g., one or more microprocessors, one or more microcontrollers, one or more digital signal processors will receive instructions e.g., from a memory or like device, and execute those instructions, thereby performing one or more processes defined by those instructions.

A "processor" means one or more microprocessors, central processing units CPUs, computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods as well as other types of data may be stored and transmitted using a variety of media e.g., computer readable media in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data e.g., instructions, data structures which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency RF and infrared IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data e.g. sequences of instructions to a processor. For example, data may be i delivered from RAM to a processor; ii carried over a wireless transmission medium; iii formatted and/or transmitted according to numerous formats, standards or protocols, such as Ethernet or IEEE 802.3, SAP, ATP, Bluetooth•, and TCP/IP, TDMA, CDMA, and 3G; and/or iv encrypted to ensure privacy or prevent fraud in any of a variety of ways well known in the art.

Thus a description of a process is likewise a description of a computer-readable medium storing a program for performing the process. The computer-readable medium can store in any appropriate format those program elements which are appropriate to perform the method.

Just as the description of various steps in a process does not indicate that all the described steps are required, embodiments of an apparatus include a computer/computing device operable to perform some but not necessarily all of the described process.

Likewise, just as the description of various steps in a process does not indicate that all the described steps are required, embodiments of a computer-readable medium storing a program or data structure include a computer-readable medium storing a program that, when executed, can cause a processor to perform some but not necessarily all of the described process.

Various embodiments can be configured to work in a network environment including a computer that is in communication e.g., via a communications network with one or more devices. The computer may communicate with the devices directly or indirectly, via any wired or wireless medium e.g. the Internet, LAN, WAN or Ethernet, Token Ring, a telephone line, a cable line, a radio channel, an optical communications line, commercial on-line service providers, bulletin board systems, a satellite communications link, a combination of any of the above. Each of the devices may themselves comprise computers or other computing devices, such as those based on the Intel® Pentium® or Centrino® processor, that are adapted to communicate with the computer. Any number and type of devices may be in communication with the computer.

In one embodiment, the present invention may be practiced on a network of one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention e.g., a step is performed by or with the assistance of a human.

While the present invention is disclosed in terms of various specific embodiments, it can be appreciated that these embodiments are by way of example only. The scope of the invention is defined by the appended claims.

What is claimed is:

1. A method for using a touch interface to detect a lateral edge of a human hand for multi-player card gaming, comprising:
   providing a general purpose computer having a main board with program memory, a processor and RAM connected in operative communication;
   providing an interface in operative communication with the processor, the interface being accessible by a first player and a second player;
   the processor causing the interface to display a card having a value, the value being hidden;
   detecting a touch from the first player as multiple points of contact indicative of the lateral edge of the human hand on the interface; and
   detecting simultaneous movement of the multiple points of contact sweeping over the card reveals the value of the card to the first player and assures that the human hand of the first player is positioned optimally with respect to the interface to hide the value of the card from the second player.

2. A method as set forth in claim 1, wherein the card has a center and detecting simultaneous movement detects the lateral edge of the human hand sweeping towards the center of the card.

3. A method as set forth in claim 1, wherein revealing the value of the card includes bending the card to reveal at least one corner of the card.

4. A method as set forth in claim 1, further comprising: un-detecting the touch and hiding the value of the card.

5. A method as set forth in claim 1, further comprising: detecting movement of the lateral edge of the human hand sweeping away from the card, and hiding the value of the card.

6. A method for enabling a player, and competing players, to use a touch interface for card gaming, comprising:
   providing a computer having a main board with program memory, a processor and RAM connected in operative communication;
   providing an interface in operative communication with the processor;
   displaying a card having a value on the interface, the value being hidden from the player and the competing players;
   detecting a lateral edge of a human hand of the player on the interface; and
   detecting movement of the lateral edge of the human hand of the player over the card with the interface to reveal the value of the card on the interface to the player while the human hand of the player hides the value from the competing players.

7. A method as set forth in claim 6, wherein detecting movement detects movement of multiple points of contact of the lateral edge of the human hand on the interface.

8. A method for secretly revealing a card value on a multi-player card gaming interface, comprising:
   providing computer having a main board with program memory, an interface, a processor and RAM connected in operative communication;
   the computer displays a card on the interface to a first player, the card having a value, the value being hidden from a first player and a second player;
   detecting touch and movement of a lateral edge of a human hand of the first player on the interface, the touch includes multiple points of contact between the lateral edge of the human hand and the interface;
   revealing the value of the card to the first player in response to the movement of the multiple points of contact; and
   detecting the movement of the multiple points of contact reveals the value of the card to the first player and assures that the human hand of the first player is positioned optimally with respect to the interface to hide the value of the card from the second player.

9. A method as set forth in claim 8, wherein the multiple points of contact have a curved pattern.

10. A system for card gaming, comprising:
    a interface accessible by a first player and a second player;
    a general purpose computer having a memory and a processor, the computer being connected in operative communication with the interface and the processor controls the interface;
    the interface displays at least one card on the interface, the card having a value, the value is normally hidden from the first player and the second player;
    the interface detects a touch of a lateral edge of a human hand of the first player;
    the interface detects movement of the lateral edge of the human hand of the first player; and
    the touch screen reveals the value of the card to the first player in response to the movement of the lateral edge of the human hand,
    detecting the movement of the lateral edge of the human hand of the first player reveals the value of the card to the first player and assures that the human hand is positioned optimally with respect to the interface to hide the value of the card from the second player.

11. A system as set forth in claim 10, wherein the interface detects linear movement of the multiple points of contact.

12. A system as set forth in claim 10, wherein the interface detects arcuate movement of the multiple points of contact.

13. A system as set forth in claim 10, wherein the card has a center, the interface detects movement of the lateral edge of the human hand in a direction towards the center.

14. A system as set forth in claim 10, wherein the card has a center, the interface detects movement of the lateral edge of the human hand sweeping over the center.

15. A system as set forth in claim 10, wherein the card has a front side and a back side, and the system initially shows the back side and then bends the card in response to the movement of the lateral edge of the human hand to reveal the value of the card.

16. A system as set forth in claim 10, wherein the card has a front side and a back side, and the system displays advertising on the back side.

17. A system as set forth in claim 10 further comprising: a network having multiple interfaces in operative communication over the network.

18. A system as set forth in claim 10, wherein the interface displays multiple card hands to enable the interface to accommodate multiple players.

19. An apparatus for multi-player card gaming comprising:
- an interface accessible by a first player and a second player, the interface displays a card having a normally hidden value, the interface being adapted to detect movement of the lateral edge of a human hand of the first player on the interface over the card;
- a computer in operative communication with the interface, the computer having memory, a processor and software for operating the interface; and
- detecting the movement of the lateral edge of the human hand of the first player reveals the value of the card to the first player and assures that the human hand of the first player is positioned optimally with respect to the interface to hide the value of the card from the second player.

20. An apparatus for card gaming, comprising:
- an interface including a multi-touch screen to enable card game play by a first player and a second player;
- a general purpose computer having a memory, a processor and software, the computer being connected in operative communication with the multi-touch screen;
- the multi-touch screen being able to display at least one card having a value, the value normally being hidden;
- a detection means on the multi-touch screen being able to detect movement of a lateral edge of a human hand of the first player on the multi-touch screen; and
- the processor controls the multi-touch screen and causes the multi-touch screen to reveal the value of the card in response to the movement,
- when the detection means detects the movement of the lateral edge of the human hand of the first player on the multi-touch screen, the interface reveals the value of the card to the first player and assures that the human hand of the first player is positioned optimally with respect to the interface to hide the value of the card from the second player.

* * * * *